United States Patent [19]

Marks et al.

[11] Patent Number: 5,485,665
[45] Date of Patent: Jan. 23, 1996

[54] GASKET SIZE CONTROL

[75] Inventors: Kevin T. Marks, Crick; Nigel D. Salter, Wellesbourne; Rosario Remedios; Peter Waddington, both of Rugby, all of United Kingdom

[73] Assignee: T&N Technology Limited, Rugby, England

[21] Appl. No.: 185,842

[22] PCT Filed: Jul. 17, 1992

[86] PCT No.: PCT/GB92/01217

§ 371 Date: Jan. 21, 1994

§ 102(e) Date: Jan. 21, 1994

[87] PCT Pub. No.: WO93/02303

PCT Pub. Date: Feb. 4, 1993

[30] Foreign Application Priority Data

Jul. 23, 1991 [GB] United Kingdom ............... 9115862

[51] Int. Cl.⁶ ..................... F16J 15/12; B21C 47/06
[52] U.S. Cl. ..................... 29/407; 72/146; 242/413.1; 242/413.2
[58] Field of Search ............... 29/407, 455; 72/131, 72/132, 146; 242/413, 534.2, 413.1, 413.2

[56] References Cited

U.S. PATENT DOCUMENTS

| | | | |
|---|---|---|---|
| 3,898,436 | 8/1975 | Pottebaum et al. | 242/534.2 |
| 3,905,090 | 9/1975 | Painter | 29/455 |
| 3,926,445 | 12/1975 | Farnam | 277/204 |
| 4,048,829 | 9/1977 | Thomas | 72/148 |
| 4,781,048 | 11/1988 | Richardson | 72/146 |

FOREIGN PATENT DOCUMENTS

| | | | |
|---|---|---|---|
| 4291048 | 10/1992 | Japan | 242/534.2 |
| 1269894 | 4/1972 | United Kingdom . | |
| 1531491 | 11/1978 | United Kingdom . | |
| 2121487 | 12/1983 | United Kingdom . | |

*Primary Examiner*—Mark Rosenbaum
*Assistant Examiner*—Kenneth J. Hansen
*Attorney, Agent, or Firm*—Synnestvedt & Lechner

[57] ABSTRACT

The size of the spiral gaskets which are formed by winding a sealing strip and a compressible filler strip around a mandrel is controlled by measuring the angle through which the mandrel turns, e.g., by means of an encoder. The lengths of arcs on the periphery of the gasket as it is wound around the mandrel are also measured, e.g., by means of a wheel running on the periphery of the gasket and an encoder counting turns of the wheel. The arcs are defined by the angles through which the mandrel turns. The supply of strip is terminated, e.g., by cutting the strips, as result of an arc achieving a particular length.

15 Claims, 4 Drawing Sheets

GASKET SIZE CONTROL

This invention is concerned with gasket size control for spiral wound gaskets.

Spiral wound gaskets are well known and are formed by winding a sealing strip, usually of steel, and a compressible filler strip around a mandrel so that the filler strip is interposed between turns of the sealing strip. In the process of forming such a gasket, the sealing strip is passed between embossing rollers to give it a V-shaped cross-section and an end of the sealing strip is connected to the mandrel. The end of the sealing strip is usually manually fed into a radial slot formed in the mandrel, the cross-sectional shape of the slot may match that of the strip. The mandrel is then rotated through more than one turn drawing strip on to the periphery of the mandrel. Next, a closed loop of the sealing strip is formed around the mandrel by welding overlying parts of the sealing strip on the mandrel together. Next, an end of the filler strip is manually-fed into the nip between the sealing strip already on the mandrel and the sealing strip waiting to be wound onto the mandrel. The mandrel is then rotated so that both the filler strip and the sealing strip are drawn onto the mandrel and a spiral gasket is formed with the compressible filler strip interposed between turns of the sealing strip. To terminate the gasket, the supply of filler strip to the mandrel is terminated and at least one further turn of the sealing strip is applied to the mandrel by rotation thereof and overlying turns of the sealing strip are again welded together to form a complete loop of the sealing strip around the outside of the gasket. During the formation of a gasket a compression roller runs on the edge of the gasket and controls the degree of compression which the filler strip experiences. The compression roller is withdrawn from the mandrel at a predetermined rate so that the filler is compressed by an amount which is dependent upon the rate at which the compression roller is moved in relation to the turning of the mandrel. Alternatively, the compression roller may be subjected to a constant pressure throughout winding of the gasket.

To control the size of such spiral wound gaskets, i.e., the length of the outer diameter thereof, the number of turns of the mandrel is controlled. In such a process, the mandrel is rotated for a pre-determined number of turns with both filler and sealing strips being supplied to the mandrel. However, this process results in a considerable variation in the diameters of the gaskets formed. These variations are caused by variations in the thickness and in the compressibility of the compressible filler strip and by variations in the pick-up point of the filler strip. It is, therefore, common practice to provide one or more extra turns of the sealing strip which can be broken off to different lengths to adjust the diameter of the gasket. However, the provision of such extra turns is wasteful in material, requires a skilled sizing operation and requires an extra welding operation to secure the final end of the sealing strip.

It has been proposed that the size of a spiral gasket should be controlled by measuring its radius continuously as it is formed by running a pointer on the periphery of the gasket and detecting the radius from the movement of the pointer. However, it is found that the radius at a given point is not a good measure of the overall size of the gasket because during its formation the gasket is subject to distortion caused by the pressure applied thereto by a pressure roller which presses the sealing strip against the compressible filler. The pressure roller also guides the sealing and filler strips onto the periphery of the mandrel and ensures that the successive turns lie on top of one another.

It is an object of the present invention to provide an improved method for controlling the size of spiral gaskets.

The invention provides a method of controlling the size of spiral gaskets which are formed by winding a sealing strip and a compressible filler strip around a mandrel so that the filler strip is interposed between turns of the sealing strip, characterised in that the method comprises measuring the angle through which the mandrel turns and the length of arcs on the periphery of the gasket as it is wound, the arcs being defined by angles through which the mandrel turns, and terminating the supply of strip as a result of an arc achieving a particular length.

In a method in accordance with the invention, the size of the gasket is controlled in accordance with its peripheral length as determined from the length of an arc. This is found to be a considerably more reliable method of controlling the size than either counting the number of turns of the mandrel or measuring the radius at a point on the periphery of the gasket as it is wound. Specifically, the supply of the filler strip is terminated first, e.g., by cutting the filler strip, and the supply of the sealing strip is continued for a pre-determined number of revolutions of the mandrel so that the overlying turns of sealing strip can be secured together, e.g., by welding. Allowance is made for the tails of filler strip and sealing strip between the cutters for the strip and the mandrel.

A method according to the invention can be utilised on spiral gaskets which are circular in form i.e., which are formed on a circular mandrel, or on gaskets of other shapes, i.e., formed on mandrels of appropriate shapes.

Preferably, in a method in accordance with the invention the lengths of successive arcs are measured and the supply of strip is maintained for a controlled time after said particular length is achieved, the duration of said controlled time being a function of the rate of increase of the lengths of said successive arcs. In this way, it is possible to predict when a pre-determined diameter will be achieved for the gasket and to terminate the supply of strip at the appropriate time to achieve such a diameter.

Alternatively, the lengths of successive arcs may be measured and the supply of strips be maintained for a controlled angular turn of the mandrel after said particular length is achieved, the size of said controlled angular turn being a function of the increase of arc length per unit turn of the mandrel. This technique takes account of variations in the speed of the mandrel which may be desired.

Preferably, the method of the invention also comprises monitoring the quantity of filler strip entering the gasket, and controlling the rotation of the mandrel and/or the pressure applied to the gasket as it is formed in accordance with the monitored values, including the size of the gasket which is monitored continuously as it is wound. In this way, variations in the filler strip can be catered for by applying more or less turns to the gasket or varying the pressure applied to the gasket as it is wound or by both these measures. Furthermore, it is possible to adjust the compression of the filler strip in the gasket so that it has a more uniform thickness than is presently achievable or has a specified compression variation through the gasket. It Is also possible to control the rotation of the mandrel to reduce the possibility of the filler strip breaking. The pressure may be varied by controlling the position of a pressure roller in relation to the mandrel, e.g. by the use of a servo-motor. The quantity of filler strip can be monitored by counting turns of a roller in contact with the filler strip.

It is a further object of the present invention to provide a machine for use in forming spiral gaskets having improved control of the size of gaskets formed.

Accordingly, the invention also provides a machine for use in forming spiral gaskets which are formed by winding a sealing strip around a mandrel with a compressible filler strip interposed between turns of the sealing strip, the machine comprising a mandrel, and rotating means operable to rotate the mandrel, characterised in that the machine also comprises angle measuring means operable to measure the rotation of the mandrel, length measuring means operable to measure the lengths of arcs along the periphery of a gasket as it is wound, the arcs being defined by the angle measuring means, and control means operable to terminate the supply of strip to the mandrel as a result of an arc achieving a particular length.

Preferably, the angle measuring means comprises an encoder mounted on a spindle about which the mandrel rotates.

The length measuring means may comprise a wheel running on the periphery of the gasket and an encoder measuring the rotation of the wheel.

The control means is preferably operable to terminate the supply of strip after a controlled time after said particular length is achieved, the duration of said controlled time being calculated as a function of the rate of increase of the lengths of the successive arcs.

The control means may alternatively be operable to terminate the supply of strip after a controlled angular turn of the mandrel after said particular length is achieved, the size of said controlled angular turn being a function of the increase of the arc length per unit turn of the mandrel.

The machine may also comprise or be associated with a measuring device for measuring the internal diameter of a support ring for a gasket, and said particular length be determined as a function of the internal diameter measured. This enables the gasket to be "tailor made" for a support ring.

In order to avoid manual connection of the sealing strip to the mandrel which is time-consuming, causes an undesirable tag on the inside of the gasket which has to be broken off in a separate operation, and makes it difficult for the gasket to be automatically removed from the mandrel, the machine may comprise a peg projecting from the periphery of the mandrel, piercing means operable to form a hole through an end portion of the sealing strip and feeding means operable to feed the strip, to bring the hole against the mandrel into position to be received on the peg. This enables the sealing strip to be automatically connected to the mandrel without the above-mentioned tag.

It is found that the portion of the strip containing the hole does not need to be removed at the completion of a gasket and does not make it difficult to remove the gasket from the mandrel by a conventional pusher mechanism. Preferably, the beg projects approximately 1 mm from the mandrel.

The machine may also comprise flattening means operable to flatten an end portion of the sealing strip in which the hole is formed. Flattening the end of the strip enables the end portion to rest in closer proximity to the mandrel around the peg.

The machine may also comprise trimming means operable to trim a flattened end portion of the sealing strip to the width of the remainder of the strip. This ensures that the flattened portion does not project beyond the sides of the remainder of the gasket in the finished gasket.

The machine may also comprise filler feeding means operable to feed filler strip into the nip formed between sealing strip on the mandrel and sealing strip waiting to be wound onto the mandrel. Detecting means may be provided to detect when the filler strip begins to be wound onto the mandrel. Such detecting means may be in the form of an encoder driven by the movement of the filler strip.

The method and machine of the invention enable more consistent gaskets to be made.

There now follows a detailed description, to be read with reference to the accompanying drawings, of a machine which is illustrative of the invention and of the method of operation of the machine which is illustrative of a method in accordance with the invention.

Figure 1:
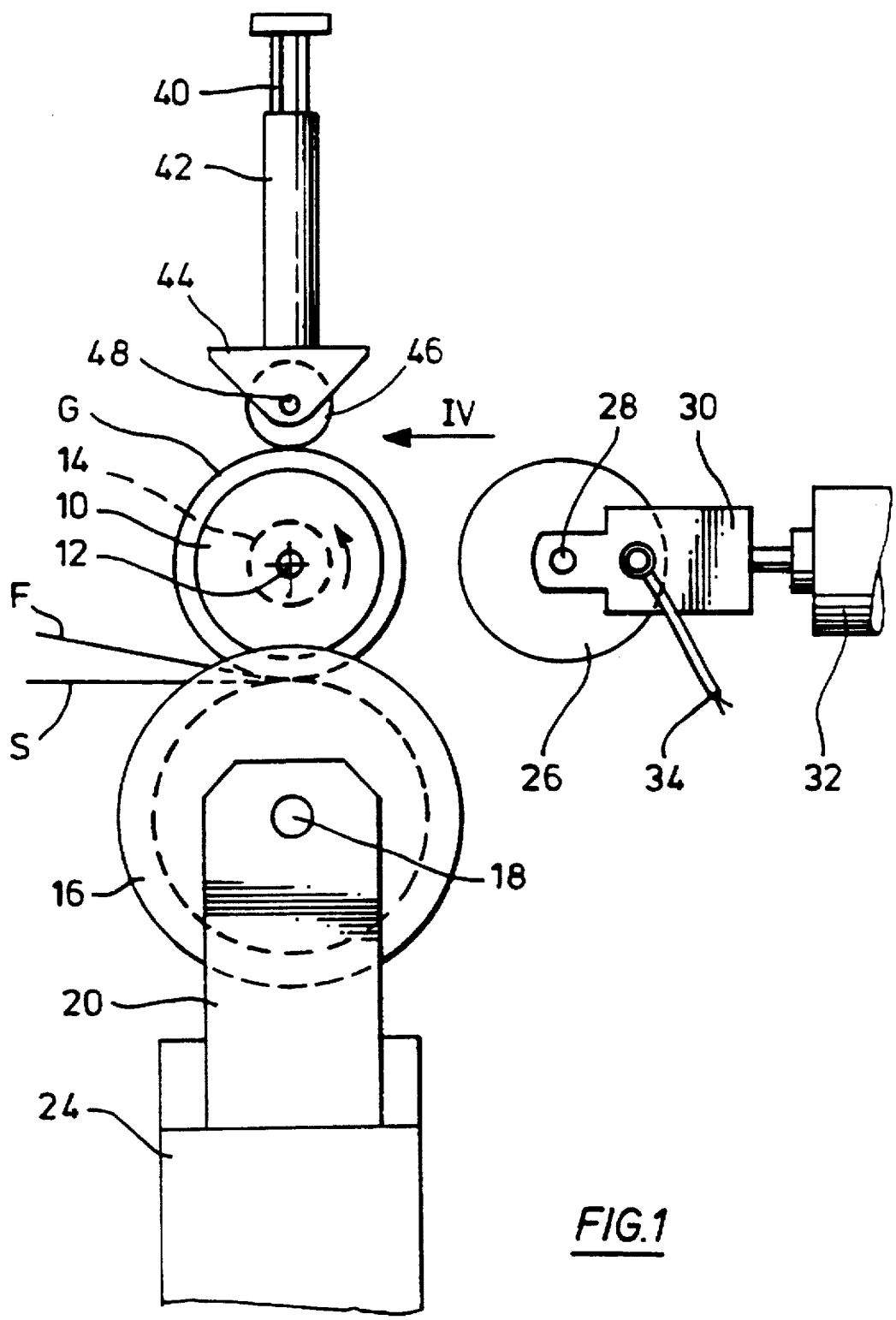
FIG. 1 is a diagrammatic front elevational view of the illustrative machine in which the supporting structure has been omitted for clarity as have the strip feeding mechanisms which are shown in FIGS. 2 and 3.
Figure 2:
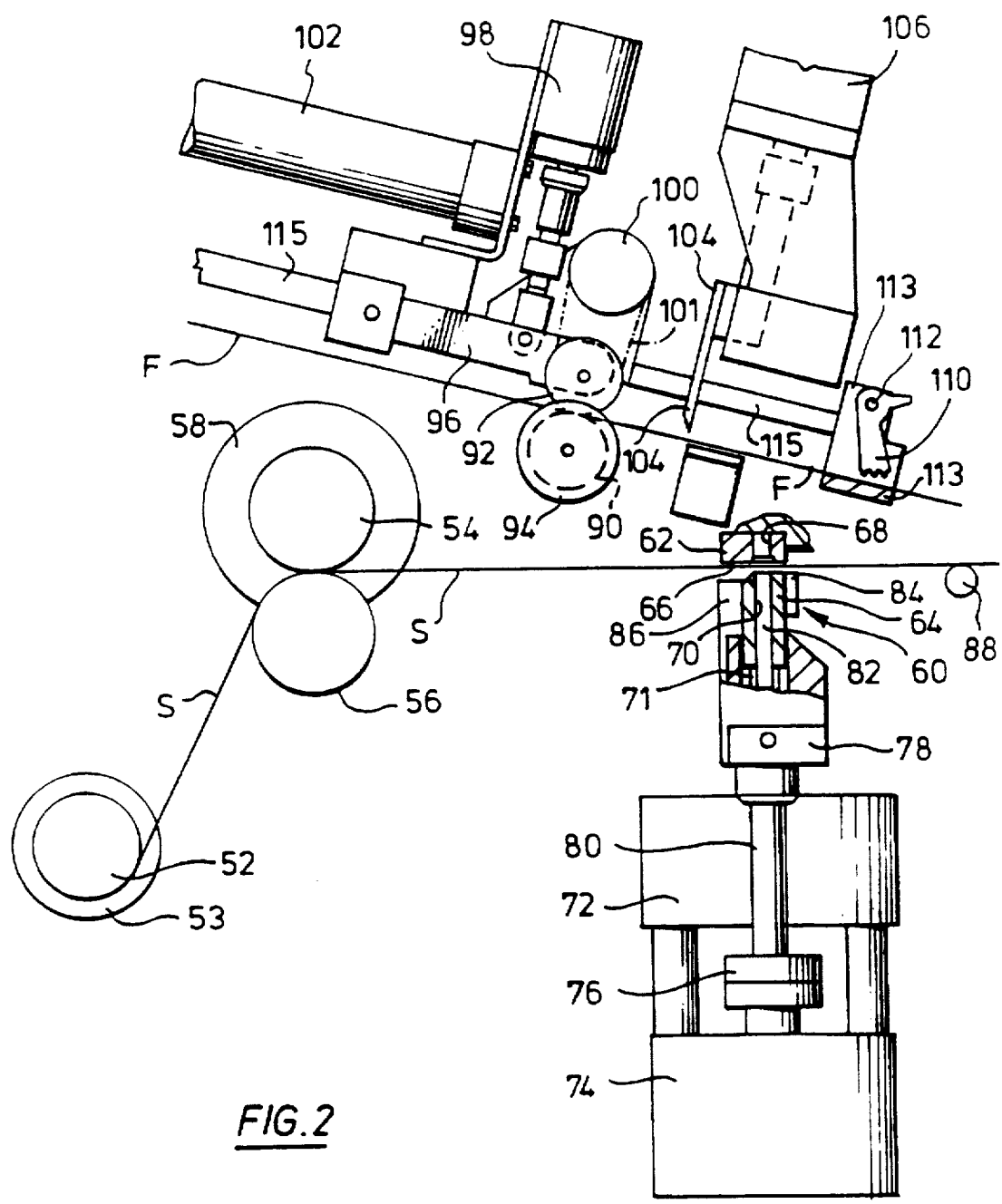
FIG. 2 is a side elevational view of strip feeding mechanisms of the Illustrative machine.
Figure 3:
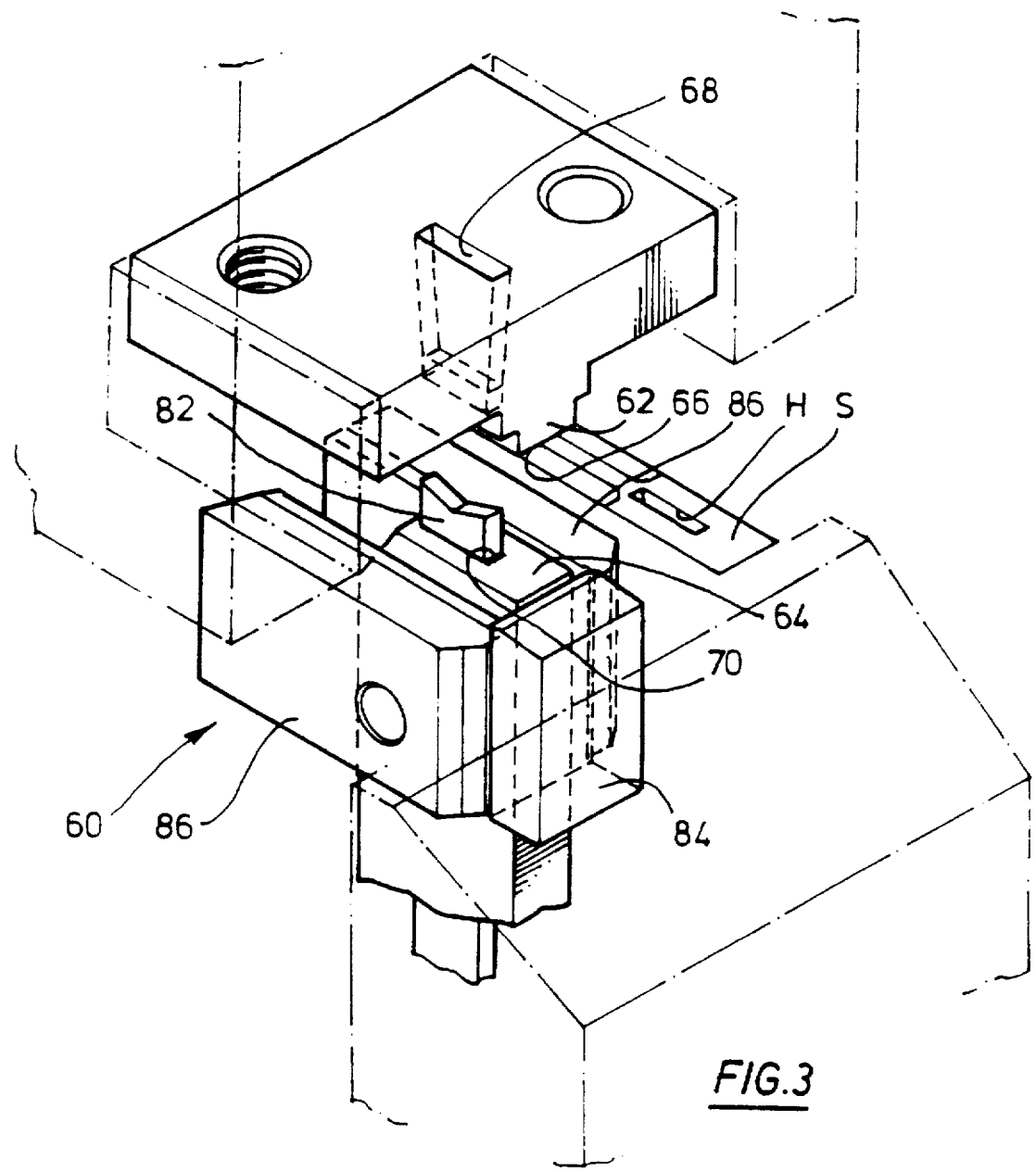
FIG. 3 is a diagrammatic exploded view of a portion of a strip feeding mechanism shown in FIG. 2.
Figure 4:
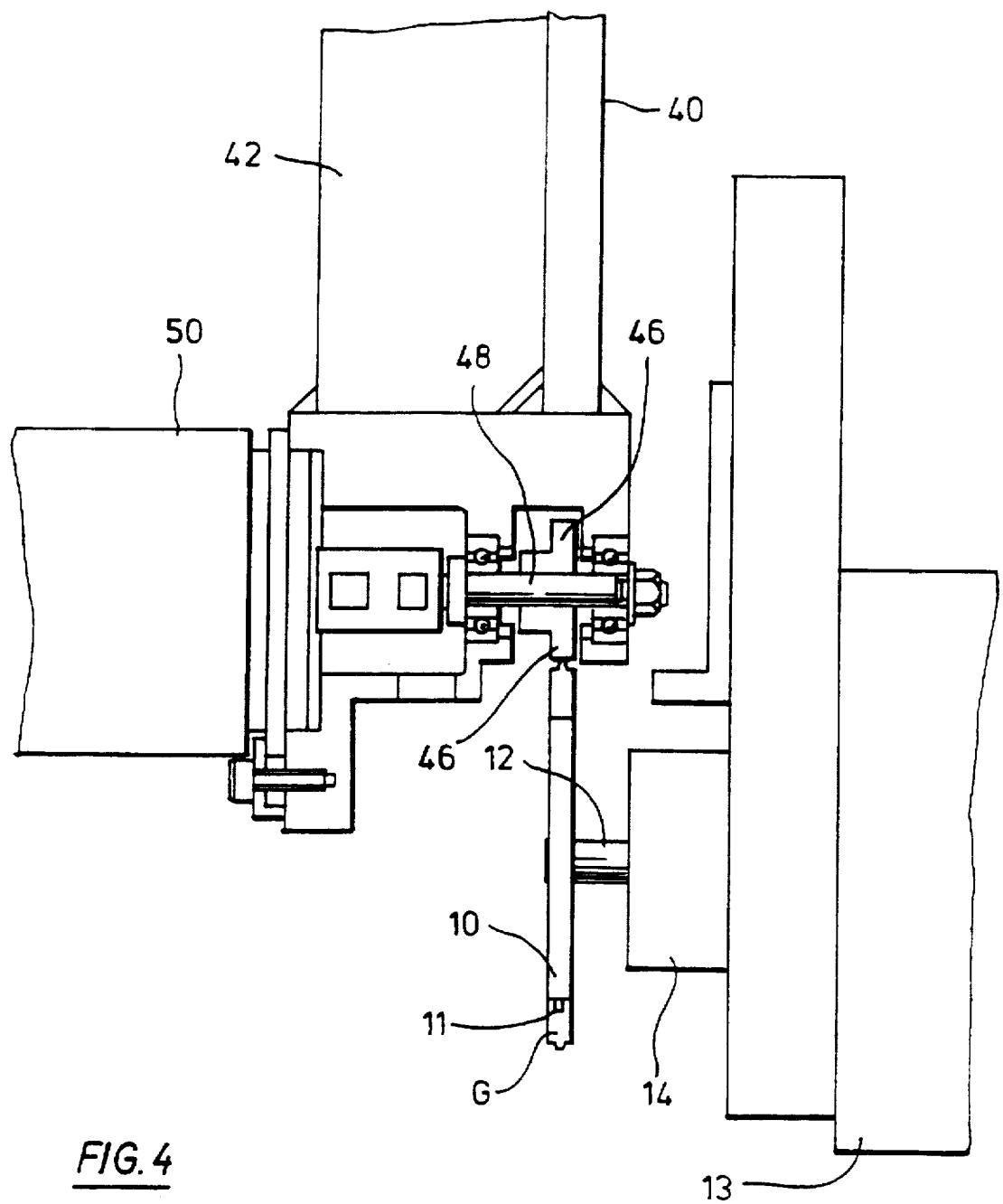
FIG. 4 is a side elevational view taken in the direction of the arrow IV in FIG. 1.

FIG. 1 omits the feeding mechanisms shown in FIGS. 2 and 3 and supporting structure and connections of the illustrative machine in the interests of clarity. The illustrative machine is for use in forming spiral gaskets G by winding a sealing strip S around a mandrel 10 with a compressible filler strip F interposed between turns of the sealing strip S. The machine comprises a mandrel 10 which is generally cylindrical but has a peg 11 projecting from its outer surface (omitted from FIG. 1 but shown in FIG. 4). The peg 11 is rectangular in plan view and projects from the mandrel by approximately 1 mm.

The mandrel 10 is mounted for rotation about a horizontal axis 12 by means of a servo-motor 13 (FIG. 4) which constitutes rotating means of the machine operable to rotate the mandrel 10 about the axis 12. An encoder 14 is operable to measure turning of a spindle on which the mandrel 10 rotates about the axis 12 and constitutes angle measuring means operable to measure the rotation of the mandrel 10. Control means of the machine in the form of a microprocessor (not shown) is connected to the motor 13 for rotating the mandrel 10 and to the encoder 14 so that the control means can control the degree and speed of rotation. In particular, the control means controls the position of the peg 11 about the axis 12 when a winding operation commences and also receives information about the angular movement of the mandrel during a winding operation.

The illustrative machine also comprises a pressure roller 16 which is mounted for rotation about a horizontal axis 18 located parallel to and below the axis 12. The pressure roller 16 is supported on a bracket 20 which is in turn mounted on a slide 24 on a vertical slideway (not shown). The slide 24 can be moved vertically by a servo-motor (not shown) which is operable via a ball screw (not shown) to move the slide 24 vertically under the control of the control means of the illustrative machine. This servo-motor is operated by the control means to control the position of the pressure roller 16 and hence the pressure which the roller applies to a gasket G being wound on to the mandrel 10. Alternatively, the slide 24 can be pressed towards the mandrel 10 by a pneumatic piston and cylinder assembly (not shown) which controls the pressure applied directly. The pressure roller 16 has a peripheral groove which is entered by the mandrel 12 so that a nip is formed between the mandrel and the pressure roller 16. When strips S and F are fed into the nip, rotation of the mandrel 10 causes them to be drawn into the nip and around the mandrel 10 with the sides of the groove of the pressure roller guiding the strips into overlying turns on the mandrel, thereby forming the gasket G. The pressure roller 16 is arranged to apply pressure to the gasket as it is formed on the mandrel, the amount of pressure being determined by the movement of the slide 24 under the control of the control means which operates the aforementioned servo-motor or piston and cylinder assembly. The pressure applied by the pressure roller 16 acts to compress the strip F between the turns of the sealing strip S.

The illustrative machine also comprises a welding wheel 26 which is mounted for rotation about an axis 28 which extends horizontally at the same level as and parallel to the axis 12 about which the mandrel 10 rotates. The welding wheel 26 is mounted on a bracket 30 which is in turn mounted on the piston rod of a horizontally-disposed piston and cylinder assembly 32 which is operable to move the welding wheel 26 into or out of contact with the periphery of a gasket being wound on the mandrel 12. The welding wheel 26 is supplied with electrical current through leads 34 and is operable to weld overlying turns of the strip S together to form complete loops about the mandrel 10. The welding wheel 26 is programmable to apply different welding conditions to suit different gaskets or to accommodate the different conditions for welding encountered at the different points in the formation of a gasket.

The illustrative machine also comprises a vertical slideway 40 disposed above and aligned with the axis 12 about which the mandrel 10 rotates. The slideway 40 carries a pneumatic piston and cylinder assembly 42 which is operable to slide itself up or down the slideway 40. A bracket 44 projects from the cylinder of the assembly 42 and carries a wheel 46 which is rotatable about a horizontal spindle 48 above the axis 12. The spindle 48 is connected to an encoder 50 which is arranged to measure the rotation of the wheel 46. The wheel 46 runs on the periphery of the gasket G which is being wound on the mandrel 10 and the combination of the encoder 50 (FIG. 4) and the wheel 46 forms length measuring means of the illustrative machine operable to measure the lengths of arcs along the periphery of the gasket G as it is wound, the arcs being defined by the encoder 14. In other words, the control means "knows" from the signal of the encoder 14 when an arc begins and ends and the encoder 50 signals to the control means the length of said arc. From the lengths of successive arcs, the control means can predict the growth of the gasket as a function of time or of angular movement of the mandrel 10. This enables the control means to determine when the supply of filler strip F and sealing strip S should be terminated to achieve a given diameter for a finished gasket.

The illustrative machine also comprises feeding mechanisms for the strips S and F which are illustrated in FIGS. 2 and 3. These mechanisms automatically feed the strips to the mandrel 10.

The sealing strip S is fed from a reel (not shown) into a feeding mechanism via a guide roller 52. The rotation of the guide roller 52 is measured by an encoder 53 which enables the control means to monitor the quantity of the strip S entering a gasket G and, in particular, to "know" when an end portion of the strip S has been picked up by the mandrel 10. The strip S enters a nip between an upper embossing roller 54 and a lower embossing roller 56. The upper embossing roller 54 is arranged to be driven by a motor 58 and the lower embossing roller 56 is spring loaded into contact with the upper embossing roller 54. The surface of the lower embossing roller 56 which engages the strip S is V-shaped and the upper embossing roller 54 has a complementary V-shaped groove in its surface which engages the strip S so that as the strip S passes the between the rollers 54 and 56 it is embossed into a V-shaped cross-section.

From the embossing rollers 54 and 56, the strip S proceeds to an end-preparation station 60 of the feeding mechanism. The station 60 is shown in diagrammatic form in FIG. 3. The purpose of the end-preparation station 60 is to prepare an end of the strip S to be automatically connected to the mandrel 10. At the station 60, the strip s passes between an upper die 62 and a lower die 64 (see FIG. 3). The upper die 62 has a planar lower surface 66 arranged to engage the strip S and a rectangular passage 68 opens through the surface 66. The lower die 64 has a planar upper surface arranged opposite the surface 66 and a passage 70 which is rectangular and aligned with the passage 68 passes vertically through the die 64. The die 64 is mounted on the piston rod (not shown) of a piston and cylinder assembly 72 which is located below the station 60. Operation of the piston and cylinder assembly 72 is effective to move the lower die 64 upwardly so that the strip is flattened between the upper and lower dies 62 and 64 and in this region loses its V-shaped cross-section and becomes a flat strip. Thus, the dies 62 and 64 and the assembly 72 constitute flattening means operable to flatten an end portion of the sealing strip S in which (as described below) a hole H is formed. Below the piston and cylinder 72 is a further piston and cylinder assembly 74 of the illustrative machine. This piston and cylinder assembly 74 is operable to move a cross-head 76 which is connected to a further cross-head 78 by means of rods 80 passing on either side of the piston and cylinder assembly 72. The cross-head 78 carries tools for operating on the flattened portion of the strip S created when the dies 62 and 64 flatten the strip. These tools comprise a piercing tool 82 which passes through the lower die 64 in the passage 70, through the strip S creating the rectangular hole H therein, and enters the passage 68 in the upper die 62. The assembly 74 and the tool 82 constitute piercing means operable to form a hole through an end portion of the strip S. The hole H has a rectangular shape which is complementary to that of the peg 11. The other tools carried by the cross-head 78 are an end cropping tool 84 operable to cut through the strip S transversely, ahead of the hole H, and two side croppers 86 forming trimming means operable to trim portions of the strip S in its flattened end portion. The croppers 86 slide past the sides of the lower die 64. The purpose of the end cropping tool 84 is to terminate the supply of strip S to the mandrel to control the size of the gasket G as a result of an arc of the gasket's periphery achieving a particular length. The purpose of the side cropping tools 86 is to reduce the width of the flattened end portion of the strip S to that The control means of the illustrative machine is operable to operate the motor 58 to drive the roller 54 so that the strip S is advanced by a pre-determined distance. After the strip leaves the end-preparation station 60, it passes over a guide roller 88 and comes to rest against the bottom of the mandrel 10. The motor 58, thus, forms feeding means operable to feed the strip S and this feeding brings the hole H against the mandrel 10 into position to be received on the peg 11. When it is in this position, operation of the servo-motor to move the roller 16 upwardly causes the free end of the strip S to be pressed against the mandrel 10 so that the peg 11 can enter the hole H and is retained therein, thereby connecting the end of the strip S to the mandrel 10. The servo-motor 13, therefore, provides means for rotating the mandrel 10 so that the peg enters the hole H.

The filler strip F is fed from a reel (not shown) to the nip between a lower embossing roller 90 and an upper embossing roller 92. The rollers 90 and 92 are similarly shaped to the rollers 54 and 56 so that they emboss a V-shaped cross-section into the strip F. This V-shaped cross-section is the similar to the cross-section of the strip S and enables turns of the filler strip F to fit snugly between the turns of the sealing strip S. The lower embossing roller 90 is arranged to be driven by a motor 94 to drive the filler strip F towards the mandrel 10. The upper roller 92 is mounted on a pivotal arm 96 which is pressed towards or away from the roller 94 by the action of a piston and cylinder assembly 98. An encoder 100 is rotated by a chain 101 driven by a sprocket (not shown) on the spindle of the roller 92 so that the control means can monitor through the encoder 100, by measuring when and by how much the roller 92 has rotated, the quantity of filler strip F entering the gasket G and when the filler strip F begins to enter the gasket G. Breakages in the filler strip F can also be detected from the encoder 100. The encoder 100, thus, provides detecting means operable to detect when the filler strip F begins to be wound onto the mandrel 10.

After leaving the embossing rollers 90 and 92, the filler strip F passes beneath a cropper blade 104 and a piston and cylinder assembly 106 operable to move the cropper 104 downwardly to cut through the filler strip F to terminate supply of the filler to the gasket G.

The machine also comprises filler feeding means operable to feed filler strip F into the nip formed between the sealing strip S in the mandrel 10 and sealing strip being wound on to the mandrel 10. The filler feeding means comprises a ratchet 110 which is pivotally mounted on a pin 112 supported by a block 113. The block 113 is generally U-shaped and extends beneath and on both sides of the strip F. The ratchet 110 rests on top of the filler strip F and by pressing it against a surface of the block 113 which extends beneath the strip F, acts to prevent relative movement between the strip F and the feeding means in a direction towards the mandrel 10. The ratchet 110 however, pivots to allow the feeding means to move past the filler strip F in a direction away from the mandrel 10. The block 113 is mounted on a rod 115 which is movable by a piston and cylinder assembly 102 of the feeding means towards or away from the mandrel 10, the rod 115 being connected to it by a bracket (not shown) extending downwardly from a piston rod (not shown) of the assembly 102. An operation of the assembly 102 can move the feeding means towards the mandrel 10 and the filler strip F is moved with it because of the action of the ratchet 110 but, in a return movement caused by the assembly 102, the filler strip F does not move as the ratchet 110 allows the feeding means to slip past the strip F.

In the operation of the illustrative machine, the size of the gaskets G which are formed is controlled by the illustrative method. In the illustrative method, the steel sealing strip S is fed around the guide roller 52 and then into the nip between the embossing rollers 54 and 56. The embossing rollers 54 and 56 alter the cross-sectional shape of the strip S from flat to V-shaped. The upper embossing roller 54 is driven by the motor 58 to move the strip S towards the mandrel 10.

From the embossing rollers 54 and 56, the sealing strip passes to the end-preparation station 60. At the end-preparation station, the sealing strip rests between the upper die 62 and the lower die 64. The upper die 62 is fixed relative to the sealing strip S. The lower die is moved vertically upwards by operation of the piston and cylinder assembly 72. This presses the portion of the sealing strip S which is between the upper and the lower dies 62 and 64 into a flattened condition.

The space below the piston and cylinder assembly 72 allows clearance for the movement of the cross-head 76 moved by the piston and cylinder assembly 74. Operation of the assembly 74 causes the tools 82 and 84 and 86 to operate on the strip S. These tools comprise the piercing tool 82 which is rectangular in transverse cross section and is arranged to move through the rectangular passage 70 in the lower die 64 to engage the strips, pierce the rectangular hole H, in the sealing strip S, and to enter the rectangular passage 68 in the upper die. The tools carried by the cross-head 78 also comprise the end cropping tool 84 which cuts through the sealing strip S ahead of the portion which has been flattened, and two side croppers 86 slide past sides of the lower die 64 and trim side portions of the flattened portion of the sealing strip S. The side croppers 86 are spaced from one another by the maximum transverse dimension of the embossed sealing strip S so that the flattened end portion of the sealing strip has the same transverse dimension as the embossed portion of the strip leaving the embossing rollers 52 and 54. Thus, at the end-preparation station 60, a portion of the sealing strip S is flattened from its V-shaped cross-section, has a rectangular hole H punched in it, is trimmed to the same width as the V-shaped portion of the strip S, and has any leading portion of the strip cut off so that the flattened portion with the rectangular hole becomes a leading prepared end of the strip. The assemblies 72 and 74 then reverse their operation to withdraw the die 64 and the tools 82, 84 and 86 from the strip S.

After the end-preparation station 60 has prepared the end of the sealing strip S, and the lower die 64 and the tools 82, 84 and 86 have been withdrawn from the sealing strip, the strip S is fed forwards by a pre-determined amount by operation of the motor 58 which drives the upper embossing roller 54. This moves the prepared end of the sealing strip S forwardly over the guide roller 88 so that the prepared end reaches a pre-determined position against the bottom of the mandrel 10 of the machine.

The mandrel 10 as afore-mentioned, is generally cylindrical and is arranged to be rotated about the horizontal axis 12 by means of the servo-motor 13. The encoder 14 is used to control the starting angular position of the mandrel 10 which is arranged so that the peg 11 is about to reach its lowermost position. The peg 11 projects from the periphery of the mandrel 10 and is arranged to fit into the rectangular hole H in the prepared end of the sealing strip S. The mandrel 10, thus, waits with the peg 11 located above and to the rear of the hole H of the prepared end of the strip S and the initial rotation of the mandrel is such as to bring the peg 11 down into contact with the prepared end so that the peg 11 enters the hole H.

Beneath the mandrel, the pressure roller 16 with its grooved periphery is moved upwardly on its slide 24 by the action of a servo-motor (not shown). The groove in the periphery of the pressure roller 16 is of sufficient size to enable the mandrel 10 to enter the groove so that a nip is formed between the pressure roller 16 and the mandrel 10. The arrangement is such that, when the pressure roller is moved upwardly on its slide, the prepared end portion of the sealing strip S enters the groove in the pressure roller 16 and is pressed into contact with the mandrel 10. This enables the peg 11 projecting from the mandrel to be retained in the rectangular hole H in the prepared end of the strip S so that the end portion of the sealing strip S is connected to the mandrel 10. The mandrel 10 is rotated for more than one revolution drawing more than one complete loop of the sealing strip S onto the outer peripheral surface of the mandrel. The rotation of the mandrel then stops and the welding wheel 26 of the machine is operated to secure overlying portions of the sealing strip S together. The welding wheel 26 rotates on the surface of the strip S and can be used to apply several welds at different angular positions. The welds create a complete closed loop of the sealing strip S around the mandrel 10.

When the overlying portions of the sealing strip S have been welded together, the filler strip F is fed into the nip formed between the sealing strip S arriving at the mandrel 10 and the strip S already wound onto the mandrel 10. To achieve this, the illustrative machine operates the piston and cylinder assembly 102.

Further rotation of the mandrel causes the filler strip F to be drawn into said nip and to be wound onto the mandrel interposed between turns of the sealing strip S. This movement is detected by the encoder 100 so that the control means of the machine "knows" exactly when filler strip F begins to enter the gasket G and can control the winding operation more precisely. When this has occurred, the assembly 102 is operated to withdraw the feeding means to its original position, the ratchet 110 allowing this movement. The piston and cylinder assembly 98 is used to relieve the pressure between the embossing rollers 90 and 92 so that the filler strip F can freely pass onto the mandrel 10. The control means applies a controlled acceleration to the mandrel 10 so that the pull on the filler strip F is controlled to reduce the possibility of breakage of the filler strip F, this being made possible by use of the encoder 14 which measures the rotation of the mandrel 10.

As afore-mentioned, located above the mandrel 10 on the vertical slideway 40 is the cylinder of the pneumatic piston and cylinder assembly 42. This assembly 42 is operated to press the wheel 46 on to the gasket G as it is wound. In particular, the wheel 46 and the encoder 50 provide length measuring means operable to measure the lengths of arcs along the periphery of a gasket G as it is wound, the arcs being defined by the angle measuring means provided by the encoder 14 which detects the angles through which the mandrel 10 has turned.

In the illustrative machine, the arcs are chosen to subtend 7.2 degrees at the axis 12 in length so there are fifty arcs in one revolution of the mandrel 10. Since it is possible to deduce the diameter of the gasket G being wound from the Lengths of the arcs measured around its periphery, the control means of the machine in the form of a microprocessor is able to determine when the gasket G being wound has reached a pre-determined diameter which is a little less than the desired diameter. When this condition is detected, the control means operates the piston and cylinder assembly 106 to cause the cropper 104 to cut through the filler strip F so that a loose end of filler strip F is created which is wound onto the mandrel. The control means takes into account the length of filler strip F between the cropper 104 and the gasket G. Rotation of the mandrel 10 is continued for at least one more revolution so that overlying loops of the sealing strip are created which do not have a filler strip F between them. The welding wheel 26 is then operated to weld overlying portions of the strip S, this being done to prevent unwinding of the gasket G when the steel strip S is cut through. The control means then operates the edge preparation station 60 so that the sealing strip S is cut through. This operation also creates an end portion of the strip S which is flattened and provided with a rectangular hole H ready for the winding of the next gasket. The tail of the strip S is then wound on to the gasket and the welding wheel 26 is then used to weld the overlying coils at the outer periphery of the gasket together to complete the gasket.

The control means is, thus, operable to measure the angle through which the mandrel 10 turns by means of the encoder 14, to measure the length of arcs on the periphery of the gasket as it is wound by means of the wheel 46 and encoder 50, and to terminate the supply of first the strip by operating the assembly 106 and then of the strip S by operating the assembly 74 as a result of an arc achieving a predetermined length. The predetermined length is calculated from the desired diameter of the gasket G and the growth which is expected to occur from the winding of the tail of the filler strip F and the strip S wound after the filler strip has been completely wound. This growth can be calculated from the length of strip involved or deduced from experience from previous similar gaskets. The termination of supply of strip S takes place after a controlled angular turn of the mandrel 10 after said particular length of arc is achieved, the size of said controlled angular turn being a function of the increase of the arc length per unit turn of the gasket. If necessary, the rate of rotation of the mandrel 10 can be slowed as the particular length of arc is approached so that more calculating time is provided.

During the winding of the gasket G the strips S and F wound onto the mandrel are maintained under pressure by the pressure roller 16 which is moved away from the mandrel by operation of the servo-motor in accordance with the gasket diameter detected by the encoder 14. If desired, the pressure applied by the pressure roller 16 can be varied during the formation of a gasket by control of the operation of the servo-motor.

When the gasket has been completed the welding roller and the pressure roller are withdrawn from the gasket which is removed from the mandrel by means of a pusher of conventional construction (not shown).

In the operation of the illustrative machine, the quantity of filler material F entering the gasket G and the size of the gasket G as it is formed are continuously monitored. This enables the control means to control the rotation of the mandrel 10 to reduce the possibility of filler breakage and to control the position of or pressure applied by the roller 16 to take account of thickness or compressibility variations in the filler.

Since the spiral gasket G is normally mounted in a support ring therefor and such support rings are of variable internal diameter, the machine may also comprise or be associated with a measuring device for measuring such internal diameter. This enables the machine to "know" the diameter required for the gasket G to fit the support ring and to make the gasket G to this size.

We claim:

1. A method of controlling the size of spiral gaskets which are formed by winding a sealing grip and a compressible filler strip around a mandrel so that the filler strip is interposed between turns of the sealing strip, characterised in that the method comprises continuously monitoring the size of the gasket as it is formed by measuring the angle through which the mandrel turns and the length of arcs on the periphery of the gasket as is it is wound, the arcs being defined by the angles through which the mandrel turns, and terminating the supply of strip as a result of an arc achieving a particular length.

2. A method according to claim 1, characterised in that the lengths of successive arcs are measured and the supply of strip is maintained for a controlled time after said particular length is achieved, the duration of said controlled time being a function of the rate of increase in the lengths of said successive arcs.

3. A method according to claim 1, characterised in that the lengths of successive arcs are measured and the supply of strip is maintained for a controlled angular turn of the mandrel after said particular length is achieved, the size of said controlled angular turn being a function of the increase of the arc length per unit turn of the mandrel.

4. A method according to claim 1, characterised in that the method also comprises monitoring the quantity of filler strip entering the gasket, and controlling the rotation of the mandrel and/or the pressure applied to the gasket as it is formed in accordance with the monitored quantity.

5. A method according to claim 4, characterised in that the pressure applied to the gasket is varied by controlling the position of a pressure roller in relation to the mandrel.

6. A method according to claim 4, characterised in that the quantity of filler strip entering the gasket is monitored by counting turns of a roller in contact with the filler strip.

7. A machine for use in forming spiral gaskets by winding a sealing strip around a mandrel with a compressible filler strip interposed between turns of the sealing strip, the machine comprising a mandrel, and rotating means operable to rotate the mandrel, characterised in that the machine also comprises angle measuring means operable to measure the rotation of the mandrel, length measuring means operable to measure the lengths of arcs along the periphery of a gasket as it is wound, the arcs being defined by the angle measuring means, and cutting means operable to terminate the supply of strip to the mandrel as a result of an arc achieving a particular length.

8. A machine according claim 7, characterised in that the angle measuring means comprises an encoder operable to measure turning of a spindle on which the mandrel rotates.

9. A machine according to claim 7, characterised in that the length measuring means comprises a wheel running on the periphery of the gasket and an encoder measuring the rotation of the wheel.

10. A machine according to 7, characterised in that is operable to terminate the supply of strip after a controlled time after said particular length is achieved, the duration of said controlled time being calculated as a function of the rate of increase of the lengths of successive arcs.

11. A machine according to claim 7, characterised in that the control means is operable to terminate the supply of strip after a controlled angular turn of the mandrel after said 12. A machine according to claim 7, characterised in that the machine also comprises a peg projecting from the periphery of the mandrel, piercing means operable to form a hole through an end portion of the sealing strip, and feeding means operable to feed the strip, to bring the hole against the mandrel into position to be received on the peg.

13. A machine according to claim 12, characterised in that the mandrel also comprises flattening means operable to flatten an end portion of the sealing strip in which the hole is formed.

14. A machine according to claim 13, characterised in that the machine also comprises trimming means operable to trim a flattened end portion of the sealing strip to the width of the strip before flattening.

15. A machine according to claim 12, characterised in that the machine also comprises filler feeding means operable to feed filler strip into the nip formed between the sealing strip on the mandrel and the sealing strip being wound onto the mandrel.

* * * * *

UNITED STATES PATENT AND TRADEMARK OFFICE
CERTIFICATE OF CORRECTION

PATENT NO. : 5,485,665
DATED : January 23, 1996
INVENTOR(S) : Marks et al.

It is certified that error appears in the above-indentified patent and that said Letters Patent is hereby corrected as shown below:

On the title page, Item [86] PCT No., change "PCT/GB92/01217" to --PCT/GB92/01317--.

Column 4, line 14, change "Illustrative" to --illustrative--.
Column 6, line 6, change "s" to --S--.
Column 6, line 67, delete "the" (first occurrence).
Column 9, line 38, change "Lengths" to --lengths--.
COlumn 10, line 43, chnage "grip" to --strip--.
Column 11, line 28, after "that" insert --the control means--.
Column 12, line 5, after "said" insert --particular length is achieved, the size of said controlled angular turn being a function of the increase of the arc length per unit of the mandrel--.

Signed and Sealed this

Sixth Day of August, 1996

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,485,665
DATED : January 23, 1996
INVENTOR(S) : Marks et al

It is certified that error appears in the above-indentified patent and that said Letters Patent is hereby corrected as shown below:

Col. 6, line 46, after "that" insert —of the remainder of the strip S which has a V-shaped cross-section.—

Col. 11, line 28, after "that" insert —the cutting means—
Col. 12, line 4, change "control" to —cutting—

Signed and Sealed this

Twenty-sixth Day of August, 1997

Attest:

BRUCE LEHMAN

Attesting Officer

Commissioner of Patents and Trademarks